(12) United States Patent
Lally

(10) Patent No.: US 6,969,260 B1
(45) Date of Patent: Nov. 29, 2005

(54) TECHNOLOGY EXPLORER TOY

(76) Inventor: Robert William Lally, 7 Eagle Heights Dr., Orchard Park, NY (US) 14127

( * ) Notice: Subject to any disclaimer, the term of this patent is extended or adjusted under 35 U.S.C. 154(b) by 33 days.

(21) Appl. No.: 10/871,103

(22) Filed: Jun. 18, 2004

(51) Int. Cl.$^7$ ............................................. G09B 23/08
(52) U.S. Cl. ..................................................... 434/302
(58) Field of Search ................................ 434/276, 300, 434/301, 302; 446/490, 491; 73/37.1, 38.1, 73/39

(56) References Cited

U.S. PATENT DOCUMENTS

| | | | | |
|---|---|---|---|---|
| 1,481,075 A | * | 1/1924 | Strouse | 434/300 |
| 1,869,951 A | * | 8/1932 | Worthington | 33/27.11 |
| 3,312,470 A | * | 4/1967 | Ames | 473/575 |
| 3,339,292 A | * | 9/1967 | Ruchlis | 434/302 |
| 3,354,559 A | * | 11/1967 | Beck | 434/302 |
| 3,698,800 A | * | 10/1972 | Belgau | 351/239 |
| 3,903,684 A | * | 9/1975 | Wilson | 368/98 |
| 3,977,085 A | * | 8/1976 | Sandifer | 33/27.11 |
| 4,544,282 A | * | 10/1985 | Sanchez Giraldez | 368/179 |
| 5,060,947 A | * | 10/1991 | Hall | 273/138.2 |
| 5,067,902 A | * | 11/1991 | Phillips | 434/276 |
| 5,137,487 A | * | 8/1992 | Hall, Jr. | 446/256 |
| 5,145,378 A | * | 9/1992 | Rott et al. | 434/302 |
| 5,192,212 A | * | 3/1993 | Kim | 434/302 |
| 5,842,902 A | * | 12/1998 | Liff | 446/130 |
| 5,895,221 A | * | 4/1999 | Nettle | 434/302 |
| 6,015,296 A | * | 1/2000 | Fenkanyn et al. | 434/301 |
| 6,110,004 A | * | 8/2000 | McKinley et al. | 446/490 |

* cited by examiner

Primary Examiner—Kurt Fernstrom

(57) ABSTRACT

Involving mysterious gravity and mystical energy, an adjustable, instrumented, structural model, incorporating an object suspended from a frame in various ways with flexible line, freely swings, falls, bounces, and vibrates when manually disturbed. Through transfers of energy, visual sensors resembling flexible lollipops both structurally sense and suppress motion, creating puzzling mysteries. Sensors don't always sense, an elastically suspended object doesn't bounce, and motion doesn't change as expected. Adding side weights doesn't change the coasting rate of a swing, confirming Newton's famous law of motion. Exhibiting the radiant, vibrant, communicant nature and behavior of energetically interacting people and things, these experiments sensibly demonstrate how forces of nature and man involved in transfers of energy animate the world, by moving objects, powering events, and sensing information.

11 Claims, 3 Drawing Sheets

TECHNOLOGY EXPLORER TOY

CROSS REFERENCE TO RELATED APPLICATIONS

Not applicable.

STATEMENT REGARDING FEDERALLY SPONSERED REASEARCH OR DEVELOPMENT

Not applicable.

BACKGROUND OF THE INVENTION

The present invention generally relates to the fields of toys, physics, education and demonstration, and measuring and testing. More specifically, it relates to an instrumented, educational, structural model that demonstrates how forces of nature and man involved in transfers of energy animate the world, by moving objects, powering events, and sensing information.

Although mystical energy: physical, mental and spiritual, evidently exists, and a transfer of energy is involved in all that happens, a need still exists for a dramatic way of demonstrating how objects energetically interact. All of a myriad of existing educational demonstrators embody and incidentally demonstrate energetic interaction, but not in a convincing way.

Needs also exist for a simple way to sensibly introduce and teach basic technology, an interactive way to self-instruct and train people technically, and a creative way to entertain and technically enlighten children and executives. Many people today want or need to learn more about the radiant, vibrant, communicant nature and behavior of energetically interacting people and things, so often experienced or encountered, and enjoyed.

Incorporating modern, behavior-testing technology, the present invention involves a new, sensible way of demonstrating energetic interaction with a familiar structure instrumented with visual motion sensors. Often viewed as mystical devices, motion sensors actually employ structures and the natural way that structures energetically interact to structurally sense and communicate information. Through transfers of energy, they both sense and suppress motion, often creating puzzling mysteries, such as an elastically suspended object that doesn't bounce, sensors that don't always sense, and motion that doesn't change as expected. For example, centrally adding mass to a swinging object doesn't change its coasting rate, confirming Newton's famous law of motion: F=ma.

BRIEF SUMMARY OF THE INVENTION

Accordingly, many of the above wants and needs are met by the present invention of an adjustable, educational, structural model incorporating a freely swinging, falling, bouncing, and vibrating object instrumented with spring-mass sensors resembling flexible lollipops. The structure consists of an object suspended in various ways with flexible line or elastic cord from a wire frame.

When disturbed or manually energized, the structural model functions to transfer forces of nature and man into motion, and motion into visual deflection of sensor springs.

Compressible materials and connections ease the task of assembling the structure, adjusting alignment, installing the sensors, and changing the configuration. Sensors and weights made of hard rubber material simply and conveniently plug onto oversize plastic posts protruding from the test object, and are elastically clamped in place. To adjust the length of the suspension and the alignment of the test object, a one-piece, flexible, plastic-coated, suspension line slides in holes in the test object and frame that lightly grip it. Knots hidden in holes terminate and secure the two ends of the line. Other novel design features facilitate changing the structure to modify its behavior.

Classical, spring-mass structures resembling lollipops serve as visual motion sensors. Naturally exchanging energy with the test-object body and the earth, they both sense and suppress motion in the direction their flat, leaf spring deflects. The sensor assembly on top of the swinging object simulates a person experiencing the soothing, relaxed feeling enjoyed when rhythmically coasting in a simple childhood swing.

But, as the invention dramatically demonstrates, without a transfer of energy nothing is sensed, too much energy transfer changes the motion of interest, and inertial motion sensors can't tell the difference between acceleration and gravity.

Like a toy chemistry set or electronics kit, various physical experiments entertain and enlighten observers. Surprisingly, the sensors normally flex to sense the horizontal coasting motion of a glider type swing, but not that of a simple swing. Centrally adding or removing mass does not change the swinging rate. Shortening the suspension speeds up the motion. Manually moving the pivots back and forth at the natural swinging rate gradually builds up big excursions. With an alternate elastic suspension connected, the swing bounces while coasting. An elastically suspended, freely falling body instrumented with an array of tuned, vertically flexing sensors does not bounce or oscillate as expected. Under the influence of gravity, vertically flexing sensors deflect downward, indicating motion even when there is none.

Therefore, the primary object of this invention is an entertaining, enlightening, educational toy that demonstrates how forces of nature and man involved in energy transfers animate the world by moving things, powering events, and sensing information.

Another object of this invention is to demonstrate modern behavior testing and health monitoring of things technology by manually disturbing an object and observing or sensing its motion, similar to the way a doctor test reflexes.

Another object of this invention is to demonstrate how energetically interacting structures can be employed to structurally sense and communicate information.

Still another object of this invention is to help people incidentally experience and enjoy the radiant, vibrant, communicant nature and behavior of energetically interacting people and things.

BRIEF DESCRIPTION OF SEVERAL VIEWS OF THE DRAWINGS

The structure of the preferred embodiment of the instrumented educational toy is illustrated in following drawings, in which.

DETAILED DESCRIPTION OF THE INVENTION

Figure 1:
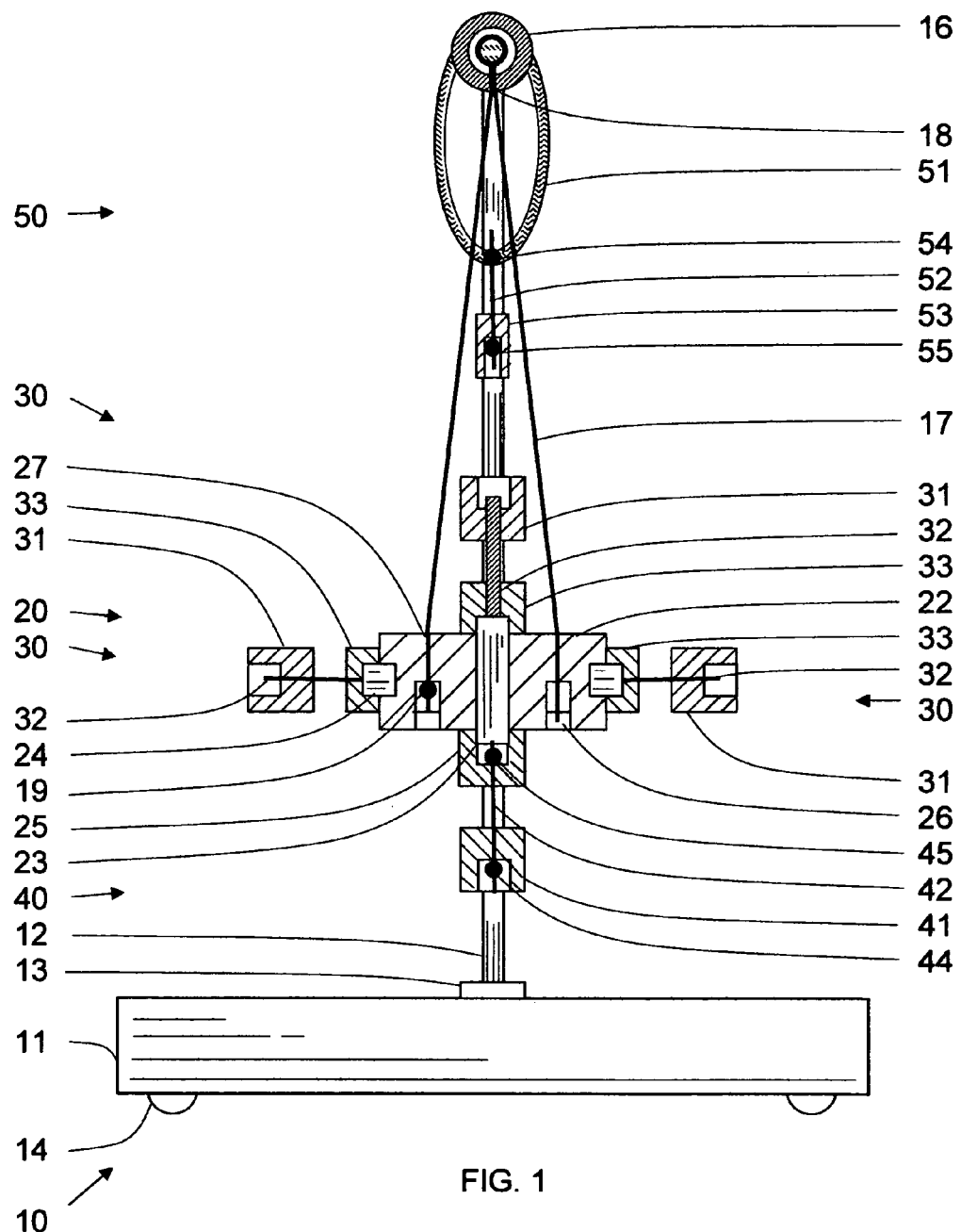
FIG. 1 is a partially sectioned, side elevation view of the invention showing an object suspended from a wire frame as both a simple and glider type swing instrumented with visual motion sensors.
Figure 2:
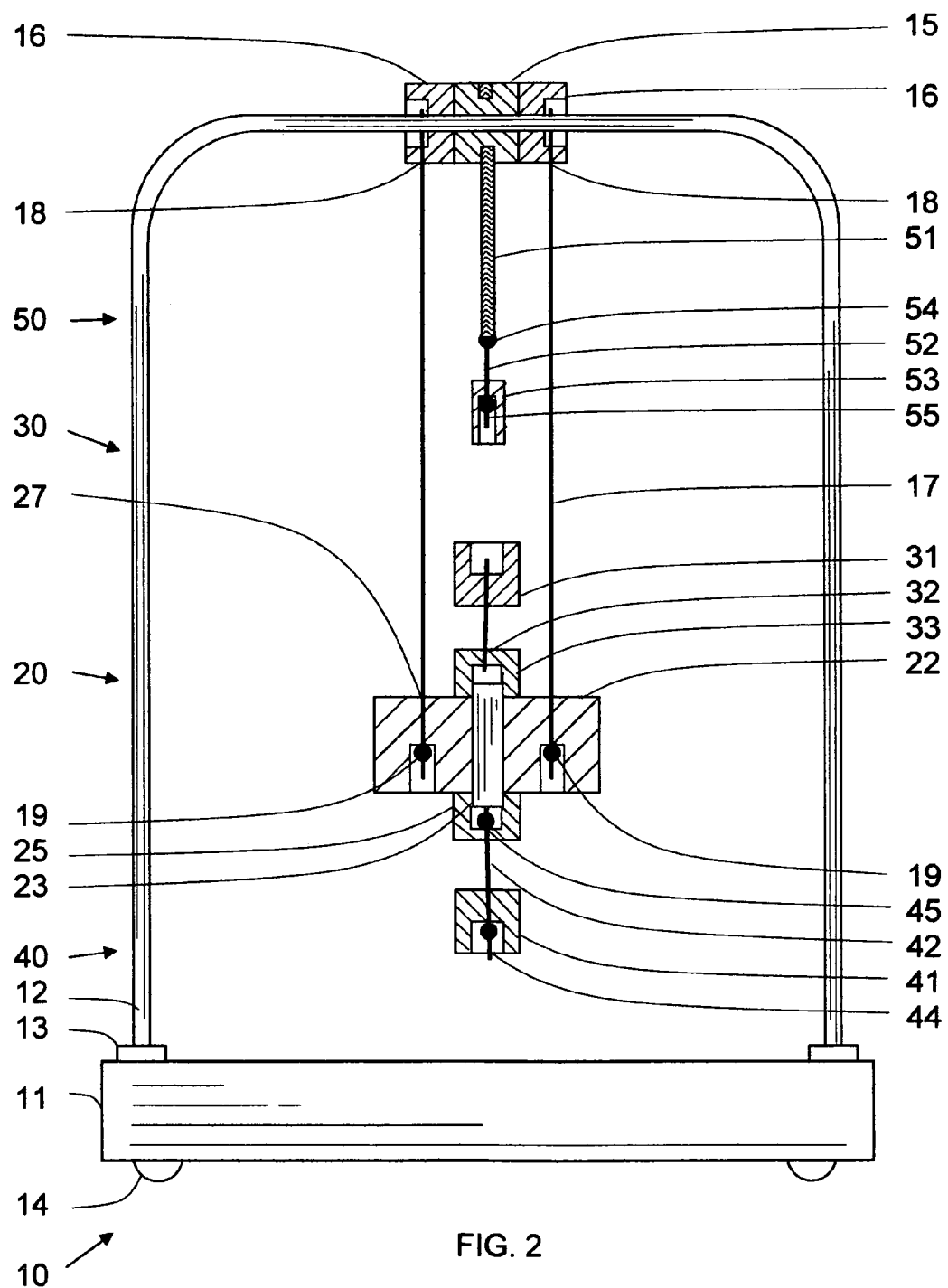
FIG. 2 is a partially sectioned, front elevation view of the same structural model showing an alternate, elastic suspension line.
Figure 3:
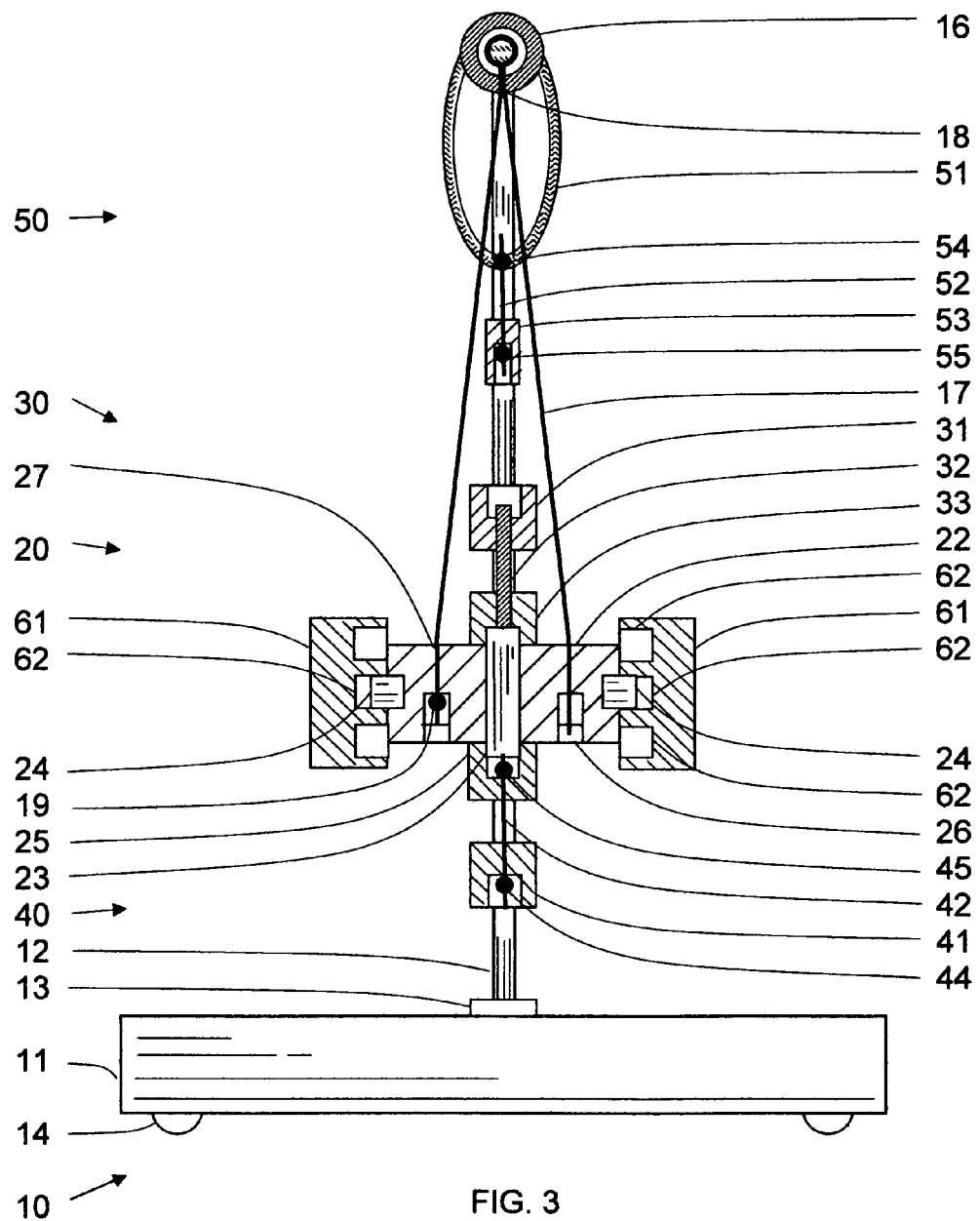
FIG. 3 is a modified version of FIG. 1 with auxiliary weights connected to the test object.

FIG. 1 and FIG. 2, which are different views of the same object, illustrate an instrumented, adjustable, structural model comprising a cylindrical, test-object body 22 suspended with a flexible line 17 as a swing from two pivot bushings 16 spaced apart on support rod 12. Holes in the test object body 22 and pivot bushings 16 route and grip the suspension line 17 at multiple pivot points 18 and 27. FIG. 3 is a modified version of FIG. 1 showing weights 61 connected to the test object 22, instead of vertically flexing sensors in the direction of arrow 30.

The test-object body 22 coasts back and forth in the plane of the support rod 12 as a glider type swing with parallel suspension arms 17 when energized in the direction of an imaginary line between the two pivots. Perpendicular to the plane of the support rod 12, the body 22 swings and coasts as a simple swing or pendulum having essentially one composite suspension arm.

The frame 10 supporting the suspended test-object body 22 consists of a formed, metal, inverted U-shaped, support rod 12 connected to a wood base block 11. Pivot bushings 15 and 16 made of hard rubber material grip the support rod 12 and line 17. The metal rod 12 plugs into hard rubber inserts 13 in the base block 11, which impart additional flexibility. Soft plastic feet 14 located underneath each corner of the base block 11 help level and isolate the model when placed on uneven surfaces. Manually moving the top of the metal support rod 12 and pivot bushings 16 back and forth gradually energizes the swing.

The flexible, one piece, suspension line 17 clamps to the frame and test object body 22 at multiple pivot points 18 and 27, forming two triangular-shaped loops spaced apart that suspend the body 22 on four like sections of line 17. The line 17 threads through holes 18 in the two pivot bushings 16, loops around the support rod 12, routes back out through the holes 18, then goes down through the four holes 27 located at corners of a square in the suspended object 22, where knots 19 secure the ends of the line 17. In a groove 26 in the bottom surface the object 22, the line 17 crosses from the triangular loop on one side of the body 22 to the loop on the other side. Routing and lightly gripping the smooth, plastic-coated line 17, holes in the body 22 and bushings 16 allow it to slide through to adjust, level and align the position of the test-object body 22 relative to the frame 10.

Pulling the knotted ends 19 of the line 17 out of the holes in the body 22 and tying temporary knots shortens the suspension and speeds up the swinging action.

In the direction of arrow 50, an alternate, vertical suspension line is composed of an elastic upper section 51 connected to a flexible lower section 52. The flexible line 52 ties to a loop of bungee cord 51 draped around a groove in bushing 15. The other end of line 52 connects to a rigid plastic post 53 that inserts into a hole in hard-rubber mass 31, which grips and holds it. Knots 54 and 55 tied near the ends of the line 52 secure the assembly. This alternate, elastic suspension allows the test-object body 22 to swing and bounce freely, and to briefly fall freely for a period of time after being lifted and dropped, or pulled down and released, which propels the assembly 20 upwards to relax the flexible line 52.

Three similar motion sensors 30 connect to the top and two sides of test-object 22. They are structured with a seismic mass 31 made of hard rubber connected and clamped to one end of a flexible, flat, plastic-beam spring 32. The other end of the beam spring 32 connects and is clamped to a mounting adapter 33, also made of hard rubber. Adapter 33 connects to and grips a tubular post 23 or 24 protruding from the test-object body 22. The flat beam 32 of the sensor 30 mounted on top of the test object 22 flexes horizontally. The beams 32 of the two, diametrically-opposed, side-mounted sensors 30 flex vertically. The sensor assemblies 30 are tuned to resonate at about the same natural frequency as the elastically suspended body 22. This array of side sensors 30 sense and suppress vertical bouncing motion when the test object mass 22 is lifted and dropped. Rotating the sensor mounting adapter 33 on its mating post 23 changes the direction the beam 32 flexes and senses. The leaf spring 32 deflects when the test-object mass 22 accelerates in the direction the spring readily deflects.

The motion-sensor mounting adapter 33 made of a block of hard rubber material has a cylindrical hole smaller in diameter than a mating post 24 protruding from the test object 22 that it plugs onto and grips when installed. Residual stresses in the elastic adapter 33 clamp together mating mounting surfaces.

A fourth motion sensor in the direction of arrow 40 is structured with a seismic mass 41 and flexible line 42. One end of the line 42 connects to the mass 41, and the other end of the line 42 connects to a hard-rubber mounting adapter 25, which in turn connects to the tubular post 23 extending from the bottom of test-object body 22. The line 42 threads through holes in the seismic mass 44 and mounting adapter 25. Knots 44 and 45 tied near the ends of the line 42 secure the assembly. Gravity acting as a spring tends to restore the sensor 40 to its neutral vertical position.

Two auxiliary weights 61 are cylindrical disks of elastic Hard-rubber material having three holes 62, one centered, in one face spaced along a diameter. Holes 62 connect to posts 19 protruding from object 22 at opposite ends of a horizontal line through the center of gravity of object 22. By means of one of the three holes 62, weights 61 plug onto and grip the oversize mating posts 19 of larger diameter. Connecting weights 61 in different holes 62 affects the location of the center of gravity, and slows down, speeds up, or does not change the coasting rate of said object 22.

Operation involves manually disturbing or energizing the structure in some way, and observing or sensing the resultant motion of the suspended test-object body 22, similar to the way a doctor tests reflexes. Several of the following seven basic experiments involve changing the structure to modify its behavior:

1. Manually moving the top of the flexible frame back and forth at the natural coasting rate of the swing adds energy in small amounts to gradually increase the swinging excursion of the test object. Varying the energizing rate tests the frequency response of the structure. Pulling aside and releasing the object allows it to coast back and forth at a natural rate, less than once per second, under the influence of gravity. Falling along its constrained, arcing path, the mass of the swinging object energetically interacts with the earth to alternately store the manually imparted energy as position and speed, until friction in the lines and air gradually dissipates it as heat.
2. Centrally connecting weights to opposing vertical sides of the swinging test object doesn't change its coasting rate, thus verifying Newton's famous law of motion, F=ma. The effect of the increase in force (weight) is cancelled by the related proportional increase in mass (inertia).

3. Changing the direction of the swinging motion affects the behavior of the sensors. Sensor springs deflect to sense the coasting motion of the glider type swing, but not the arcing motion of the simple swing. In the glider swing, gravity (weight) always acting vertically downward can't directly move the sensor mass back and forth horizontally, where sensors exchange energy with the swinging object. In the simple swing, tension in the suspension lines always acting perpendicular to the arcing path of the swing can't directly help move the sensor mass along its path. Gravity moves the entire assembly as a seemingly rigid unit, while the sensors exchange energy only with the earth.

4. Shortening the length of the suspension lines speeds up the coasting rate of the swinging object. A bigger part of gravity propels it along its arcing path because of the change in geometry.

5. When lifted and dropped, or pulled down and released to relax the flexible line, the elastically suspended test-object, instrumented with an array of tuned, vertically flexing sensors that both sense and suppress motion, doesn't appear to bounce, but the sensors flex wildly. The flexing sensors exert forces on the test object opposite to the direction it is moving.

6. When hanging quietly, the horizontal beams of the vertical motion sensors bend downward, indicating motion when there is none. In this calibrating mode, the deflection of the elastic beam represents one local g of acceleration.

7. When elastically suspended, the test object bounces while coasting, because tension in the suspension line due to weight (gravity) changes along its arcing path. The elastic bungee-cord loop acts as a force sensor measuring the changing tension.

Therefore, the creative concepts in the present invention provide a practical, useful, low cost, instrumented, educational, structural model toy incorporating and demonstrating modern technology in a fun way. It helps introduce, explore, demonstrate, and teach important technical concepts, such as energetic interaction, sensing and communicating, structural behavior testing, and health monitoring. With an optional electronic sensor kit, it can also serve as a valuable, high-technology, interactive, desktop teaching and training accessory for expanded computers acting as oscilloscopes or spectrum analyzers. When constructed with sports items, such as hockey pucks, lacrosse balls and fishing line, it visibly as well as mentally links sports and technology.

I claim:

1. An educational toy for sensibly exploring and teaching technology, comprising:
    a frame;
    an object suspended from said frame;
    flexible line connecting said object to said frame;
    at least one sensor comprising a mass connected to said object by means of a spring having one end connected to said mass and the other end connected to said object;
    whereby said object under the influence of gravity moves freely after being manually energized, and
    said spring deflects when said object accelerates normally in the direction said spring deflects.

2. The educational toy of claim 1, wherein said object is a cylindrical body of elastic material having holes routing and gripping said line.

3. The educational toy of claim 1, wherein said line is one piece clamped to said object and said frame at multiple pivot points forming two triangular-shaped loops spaced apart that suspend said object on four like sections of said line, whereby said line slides relative to said frame and said object to adjust and align the position of said object.

4. The educational toy of claim 1, wherein said line is connected to said frame at two pivots spaced apart, whereby said object coasts in the direction of a line between said pivots as a swing having two parallel suspension arms spaced apart, and coasts in a direction perpendicular to said line between said pivots as a simple pendulum having just one suspension arm.

5. The educational toy of claim 1, wherein said flexible line connecting said object to said frame is comprised of an elastic upper section connected to a flexible lower section, whereby said object bounces while swinging or coasting, and falls freely for a period of time after being lifted and dropped.

6. The educational toy of claim 1, wherein an array of said sensors horizontally connected to said object both sense and suppress the vertical motion of said object by deflecting when accelerated, which exerts forces on said object opposite to the direction it is moving.

7. The educational toy of claim 1 wherein said spring is a flat plastic beam having one end connected to said mass, and the other end connected to a mounting-adapter block of elastic material having undersize holes that grip both said beam and a mating post protruding from said test object.

8. The educational toy of claim 1 wherein said sensor is composed of said mass, a mounting-adapter block made of elastic material, and a flexible line having one end connected to said mass and the other end connected to said mounting adapter block, whereby gravity acting as said spring tends to restore said sensor to its neutral, vertical position.

9. The educational toy of claim 1 wherein said frame is a formed metal rod connected to a wood base block, whereby manually moving the top of said rod back and forth gradually increases the swinging excursion of said object.

10. An educational toy for sensibly exploring and teaching technology, comprising:
    a frame;
    an object suspended from said frame;
    flexible line connecting said object to said frame;
    two weights connected to said object at opposite ends of a horizontal line through the center of gravity of said object;
    whereby connecting said weights in different ways affects the location of the center of gravity,
    which slows down, speeds up, or does not change the coasting rate of said object when swinging.

11. The educational toy of claim 10 wherein said weights are cylindrical disks of elastic material having three holes spaced along a diameter in one face that mate with and grip an oversize post protruding from said test object.

* * * * *